June 5, 1956    C. H. MATTSON    2,749,418
APPARATUS FOR POSITIONING AND WELDING
SUPPORTS IN A CYLINDRICAL STRUCTURE
Filed Sept. 14, 1954    2 Sheets-Sheet 2
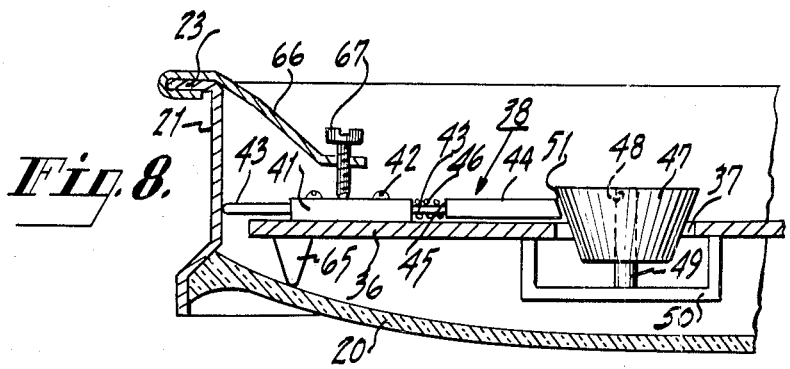
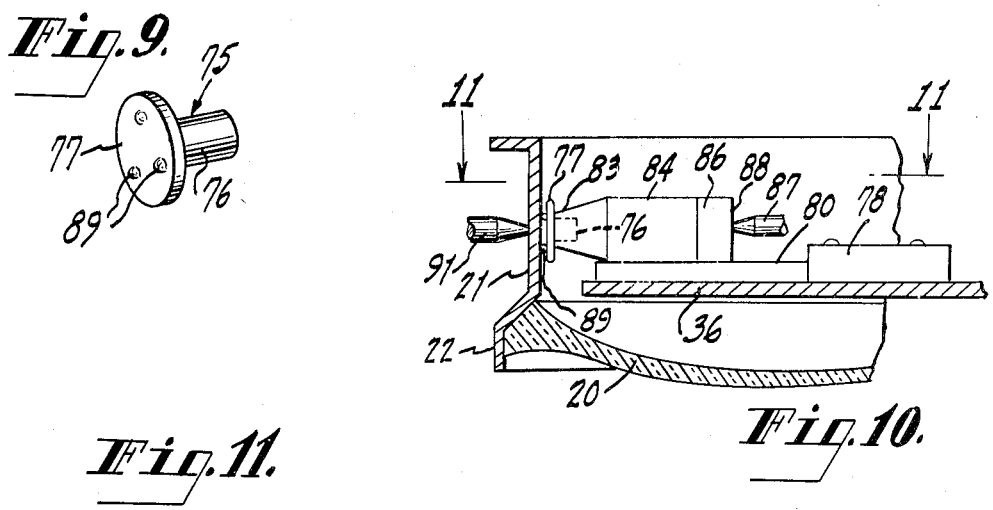
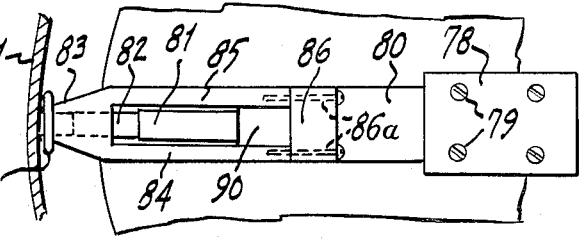
INVENTOR.
CLARENCE H. MATTSON
BY
William A. Zalesak
ATTORNEY

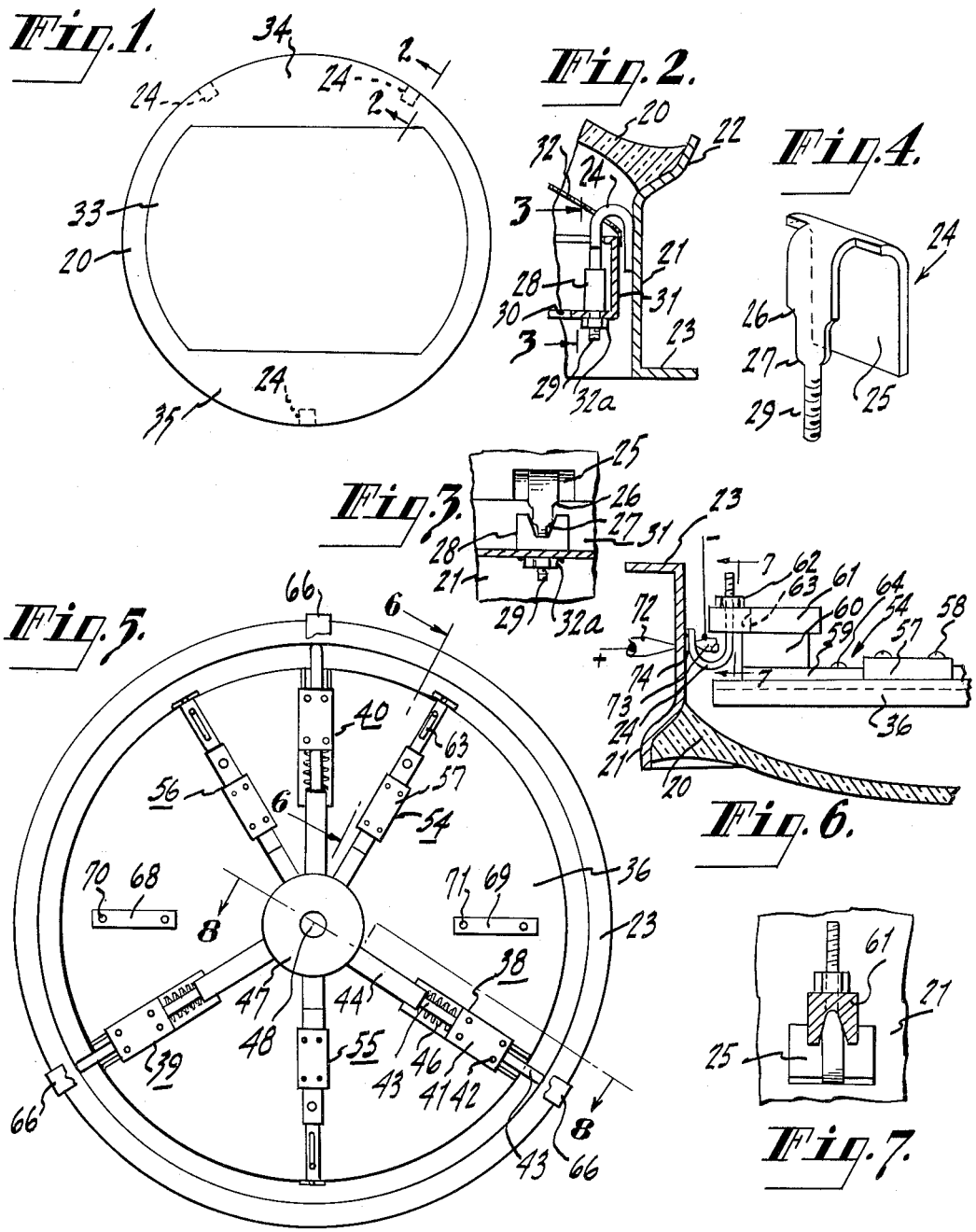

United States Patent Office 2,749,418
Patented June 5, 1956

2,749,418

APPARATUS FOR POSITIONING AND WELDING SUPPORTS IN A CYLINDRICAL STRUCTURE

Clarence H. Mattson, Paradise, Pa., assignor to Radio Corporation of America, a corporation of Delaware Application September 14, 1954, Serial No. 455,965

14 Claims. (Cl. 219—4)

The present invention relates to apparatus for positioning supports within a cylindrical structure and fixing the supports to said structure, and particularly to an apparatus for critically positioning supports in a sub-assembly of a color cathode-ray tube and welding the supports to the inner walls of a metallic cylindrical portion of such sub-assembly.

In the manufacture of one type of cathode-ray tube for use in a color television receiving system, it is the practice to prepare separately two major sub-assemblies, and then to join the two sub-assemblies in a suitable manner as by welding or sealing, to form a completed color cathode-ray tube.

One of these sub-assemblies comprises a structure including a relatively short metallic cylinder having a flange at one end to which is sealed a round glass face plate having a contour constituting a portion of a sphere. A flange is also provided at the other end of the cylinder for welding or otherwise fixing to the other major sub-assembly. The structure referred to also includes a shadow mask assembly in the form of a relatively thin apertured metal sheet having a contour similar to that of the face plate aforementioned, and fixed at its periphery as by welding, to a ring-like metallic frame. The shadow mask assembly is supported within the metallic cylinder referred to by engaging supports fixed to the inner wall of the cylinder.

The supports referred to constitute elements that infringe upon a projection of the face plate within the cylinder. It is therefore desirable that the supports be mounted at angularly spaced portions of the inner wall of the cylinder aforementioned that are remote from the effective raster produced on the face plate, during operation of the tube. The present practice of restricting the raster to rectangular or other non-round shape affords areas opposite the face plate in which the supports may be mounted without infringement upon the raster.

Since the supports referred to determine the plane in which the frame of the shadow mask is disposed when the shadow mask is in desired position with respect to the face plate, it is necessary to use three of such supports. It is impractical to space the three supports uniformly around the metal cylinder referred to, because conventional rasters of rectangular shape provide inadequate space adjacent their shorter edges for accommodating the supports outside of the raster area, the only adequate space for such accommodation being adjacent the longer edges of the raster. In practice, therefore, two of the supports are mounted so as to lie in the relatively large non-raster area adjacent one of the longer sides of the raster, and the third support is mounted in the center of the non-raster area adjacent the other of the longer raster sides. This arrangement disposes the two supports referred to in relatively close space relation, while the third support is spaced relatively far from the aforementioned two supports. In the interests of a rugged mechanical support of the shadow mask assembly, it is desirable that the two supports referred to be spaced from each other as far as possible within the non-raster area in which they are disposed. This requires that the supports be positioned relatively close to the adjacent edge of the raster area. The position in which the two supports aforementioned is mounted, therefore, becomes critical in that a maximum spread between them is desirable without infringement upon the raster.

It is also desirable that the three supports observe a predetermined spacing from the face plate so that when the shadow mask assembly is mounted thereon, the shadow mask is at a critical and uniform distance from the face plate. A determination of such predetermined spacing involves a problem in view of the curvature of the face plate. This curvature requires that an annular portion of the face plate concentric with the face plate be utilized as a reference surface from which the spacings of all three supports from the face plate is determined.

It is therefore an object of the invention to provide an apparatus for positioning the three supports referred to in a critically controlled angularly spaced relationship to permit two of the supports in one non-raster area to be disposed relatively close to the raster area without infringement thereupon.

A further purpose is to provide a positioning apparatus adapted to engage an annular portion of a spherically curved face plate and concentric with the face plate for positioning the three supports aforementioned a uniform distance from the plate.

Another aim of the invention is to provide an apparatus for positioning three supports adjacent the inner wall of a metal cylinder closed at one end by a spherically curved face plate, in predetermined angular spaced relation and at a predetermined uniform distance from the face plate, and for fixing the supports to said inner wall when positioned as aforementioned.

A further object is to provide a positioning and welding apparatus adapted to be received within a metal cylinder closed at one end by a spherically curved face plate and responsive to engagement with the inner surfaces of said cylinder and face plate for positioning three supports in contact with the inner surface of said cylinder in critically spaced areas with respect to each other and with respect to said face plate, and adapted to weld said supports to said inner surface of the cylinder when disposed in said critically spaced areas.

Briefly considered, one embodiment of the invention comprises an apparatus including a metal disc having a smaller diameter than the cylindrical portion of a face plate assembly to permit the disc to be manually placed within such portion in coaxial relation therewith. The disc is provided with three arms radially movable on one face thereof in response to a thrusting means to project beyond the periphery of the disc and into contact with the inner wall of the cylindrical portion referred to. The other face of the disc is provided with three coextensive legs spaced a uniform distance from the disc periphery. Means are also provided for determining a desired angular position of the disc within the cylindrical portion aforementioned.

The first mentioned face of the disc is provided with three additional arms mounted for radial movement thereon and critically spaced angularly. These arms serve as holders for three work pieces, such as supports to be affixed the inner wall of the cylindrical portion aforementioned.

In practice, the apparatus is manually disposed within the cylindrical portion of the assembly aforementioned with its legs resting on the face plate of the assembly. The thrusting means is then manually actuated to move the first named arms outwardly to contact the inner wall of the cylindrical portion. This causes the legs aforementioned to engage an annular portion of the spherically curved face plate that is coaxial with the face plate. The combined effect of the contact between the arms and inner wall referred to, and the engagement by the three legs of the annular portion aforementioned, effectively centers the disc with respect to the cylindrical portion, and uniformly spaces the disc from the face plate.

This registration, centering and spacing of the disc with respect to the cylindrical portion and face plate, disposes the work holding arms opposite inner wall areas of the cylindrical portion, which, when engaged by the work pieces, disposes them in desired angularly spaced positions. To cause such engagement, the three work holding arms are moved manually outwardly toward the inner wall referred to until the work pieces carried thereby, contact the areas referred to. After such contact, the work pieces are welded to the inner wall aforementioned.

It will be clear from the foregoing, therefore, that the apparatus of the invention is adapted to accurately position work pieces, such as shadow mask supports, both in a critical angular relation to avoid infringement on a raster, and in a critically spaced relation from a face plate of a color cathode-ray tube for assuring a desired spacing between the face plate and a shadow mask engaged by the supports referred to.

Further features and advantages of the invention will become evident as the present description proceeds.

In the drawing,

Figure 1 is a plan view of the face plate end of a sub-assembly of color cathode-ray tube and shows the area defined by a raster thereon.

Figure 2 is a fragmentary cross-sectional view taken along the line 2—2 of Figure 1, and shows a portion of the sub-assembly structure including a support for supporting a shadow mask;

Figure 3 is a fragmentary side view of the portion of tube structure shown in Figure 2, taken along the line 3—3 of Figure 2;

Figure 4 is a perspective view of one type of shadow mask support, which is adapted to be positioned and welded to the sub-assembly shown in Figure 1;

Figure 5 is a plan view of an apparatus embodying the invention in operative position with respect to a shadow mask support and a tube sub-assembly including a short metal cylinder and a spherically curved face plate closing one end of the cylinder;

Figure 6 is a view in cross-section taken along the line 6—6 of Figure 5, and shows fragmentary parts of the tube sub-assembly referred to and a work holding arm of the apparatus of the invention;

Figure 7 is a view partly in cross-section taken along the line 7—7 of Figure 6, and shows a portion of one of the work holding arms according to the invention;

Figure 8 is a view partly in cross-section, taken along the line 8—8 of Figure 5, and shows one of the centering arms according to the invention;

Figure 9 is a perspective view of another type of shadow mask support that may be positioned and welded by the apparatus of the invention;

Figure 10 is a side view of a work holding arm adapted to position a support of the type shown in Figure 9; and Figure 11 is a view partly in section taken on the line 11—11 of Figure 10.

Referring now to the drawing in more detail, it is believed that a consideration of the work pieces on which the apparatus of the invention is adapted to function, will facilitate an understanding of the apparatus both in respect of its structure as well as its advantages.

One of the work pieces acted on by the apparatus comprises a sub-assembly of a cathode-ray tube used in a color receiving system. This sub-assembly includes a spherically curved round face plate 20 shown in Figure 1, and a relatively short metallic cylinder 21, shown in Figure 2, having a sealing flange 22 for sealing to the face plate 20, and a flange 23 for fixing the sub-assembly to a conical sub-assembly, not shown, of the tube. The complete sub-assembly under consideration also includes a U-shaped support or hook 24, shown best in Figure 4, which has a relatively wide leg 25 welded to the inner wall of the cylinder 21. The hook 24 is provided with shoulders 26, 27 which bear against the inner beveled walls of a V-shaped block 28 shown best in Figure 3. A threaded shank 29 of the hook extends through a passageway through block 28. The block 28 is affixed to an annular flange 30 of a metallic ring-like frame 31 serving as a support for an apertured sheet-like mask 32, shown in Figure 2. The shank 29 also extends through the flange 30 and is engaged by a nut 32a for urging the shoulders 26, 27 of the hook support against the bevelled walls of the V-block 28, for support of the V-block and frame 31.

For most conveniently determining the plane in which the frame 31 is supported, three hooks 24 are angularly spaced around the inner wall of cylinder 21. However, since the hook supports 24 when fixed to the cylinder 21 extend across a projection of the face plate 20, it is important to locate the hooks in regions where such extension does not impinge upon or traverse any portion of a raster 33, shown in Figure 1. Such raster represents the effective viewing area of the face plate of the tube, and should not be restricted by view impediments, such as the hooks in question would constitute if permitted to extend into the raster area.

In view of the foregoing, it is the practice to place the hook supports 24 in such angularly spaced positions that they extend only across non-raster areas of the face plate, such as areas 34 and 35. However, in limiting the hook supports to these non-raster areas, is it impossible to space them uniformly, as by 120°. The closest approximation to such uniform spacing is realized when two of the hook supports are positioned across the extreme ends of one area 34, of the non-raster areas as shown schematically in Figure 1. This permits in one example, a maximum angular spacing between the two hooks in this area, of 110°. The third hook 24 is positioned to extend into non-raster area 35, and in this example, preferably at an equal angular distance of 125° from each of the two hooks in the area 34.

In line with the foregoing, it is a convenient practice to fix the hook-engaging V-blocks 28 to the mask frame 31 at positions thereon to match idealized positions of the hooks as aforementioned. This is a further reason for requiring that the hooks be very accurately mounted so far as angular position is concerned around the inner wall of cylinder 21.

It is also necessary to position the hooks 24, on cylinder 21 at a critical and uniform distance from the face plate 20. This is so because the hooks constitute reference means by which the spherically curved shadow mask 32 is spaced a distance that is critical from the inner surface of the face plate. In order that this distance be uniform, it is necessary that it be measured from the hooks to an annular portion of the face plate that is concentric with the face plate. This is for the reason that such measurement determines the plane in which the hooks provide a supporting surface. Once this plane is determined and utilized as a reference plane, the spacing between the shadow mask and face plate, both of which are similarly curved spherically, is rendered uniform.

The apparatus of the invention is adapted to position the three hooks 24 accurately in desired positions to provide a supporting structure of maximum mechanical strength, adapted to uniformly and critically space the shadow mask frame 31 from the face plate 20, to thereby assure a uniform and critical spacing between the shadow mask 32 and the face plate.

To this end, the apparatus includes a disc 36, shown in Figure 5, which may be of metal, and which has a central opening 37 shown in Figure 8. Mounted on the disc are three centering arms 38, 39, 40. These arms are similar in structure. As shown in Figures 5 and 8, each arm includes an elongated plate 41 fixed to the disc as by screws 42. The plate 41 has a passageway extending longitudinally therethrough for snugly receiving a finger 43. The finger 43 includes a relatively thick portion 44 defining a shoulder 45 against which one end of an expansion spring 46 is adapted to bear. The other end of the spring bears against the adjacent end of plate 41. This structure causes the finger 43 to be urged toward the center of disc 36.

For controlling the direction and magnitude of radial movements of the finger 43 in each of the arms 38, 39, 40, there is provided a frusto-conical round plug-like member 47 shown in Figure 8 having a screw threaded passageway 48 engaging screw 49 in threaded relation. Screw 49 is suitably fixed to a supporting bracket 50 supported from the underside of disc 36. The force of spring 46 causes an end 51 of the finger 43 to bear against the beveled side of plug 47. This end may be beveled as shown to provide a face engagement between such end and the side of the plug.

It will be clear from the foregoing that a manual rotation of plug 47 in one direction will cause the plug to rise on screw 49 and permit the finger 43 to move radially toward the center of the disc 36 in response to the force of spring 46. This will cause the ends of the fingers remote from the disc center to describe a circle of relatively small radius for conveniently positioning the disc within the cylinder 21. Rotation of the plug in the opposite direction will then cause outward radial movement of the fingers 43 against the force of spring 36, until the outer ends of the fingers of all three arms 38, 39, 40, contact the inner wall of cylinder 21. Since the fingers are all of equal length, such contact will automatically dispose the disc in concentric relation with respect to cylinder 21.

Before the plug 47 is rotated to cause the fingers 43 to engage the inner wall of cylinder 21, the disc is rotated to align the support arms 54, 55, 56, with areas on the inner surface of the cylinder 21, which have been previously cleaned of oxides to facilitate welding the mask supports 24 thereto. Such areas are readily recognizable because of the difference in color between such areas and areas from which oxides have not been removed. In practice the disc 36 is rotated prior to extension into the cylinder 21 to obtain as close registry as possible between the mask supports carried by arms 54, 55, 56. If after such extension, the registry aforementioned should not be as accurate as desired, the disc is rotated in the cylinder as above mentioned until accurate registry is obtained.

In one embodiment as shown in Figures 5 and 6, the work holding arms 54, 55, 56 each comprise a structure for holding a hook type support 24 shown in Figure 4. The structure referred to includes an elongated plate 57 fixed to disc 36 as by screws 58 and extending radially thereof. The plate 57 has a passageway, not shown, receiving a slide plate 59 in snug relation. Affixed to the slide plate 59 and extending to the outer end thereof is a block 60 supporting a V-block 61. As shown in Figure 7, the V-block is adapted to receive and engage the shoulders 26, 27 of the hook 24. A nut 62 serves to hold the hook in the V-block. The V-block referred to is provided with an elongated aperture 63 for receiving the shank 29 of the hook. This manner of supporting the hook 24 permits some angular movement of the hook on vertical and horizontal axes, for a purpose to be described.

The angular spacing between the three work holding arms is fixed on the disc 36. In one example, this angular spacing is 110° between the arms 54 and 56, and 125° between arm 55 and each of arms 54, 56. When the disc 36 is centered with respect to cylinder 21 as aforedescribed, and the arms 54, 55, 56 are accurately in radial registry with the deoxidized areas on the inner wall of cylinder 21, the assembly, comprising the slide plate 59, the support block 60 and V-block 61, is manually moved in a radial path determined by the passageway in plate 57, until the hook carried by the arm, contacts the deoxidized areas aforementioned on the inner wall of cylinder 21. Should the initial position of the hook be such as to dispose its flat side 25 in angular relation to the cylinder wall, it is free to move angularly in two perpendicular planes to dispose the flat side of the hook in substantially parallel relation to the cylinder wall. When the hook has assumed such parallel relation, a set screw 64 is provided for locking the slide plate 59 against further movement.

While the aforedescribed structure of the apparatus of the invention serves to center the disc 36 with respect to the cylinder 21, means are also provided for spacing the work holders a uniform and accurate distance from the face plate 20 so as to position the hooks 24 in a reference plane normal to the axis of the face plate. This is essential in order that the hooks may support a shadow mask assembly a uniform distance from the face plate. This means comprises three legs, one of which is shown at 65 in Figure 8. The three legs are of similar shape and are uniformly spaced 120° in fixed relation on the underside of disc 36. The legs are also equidistantly spaced from the outer periphery of the disc and preferably relatively close to said periphery.

After the disc 36 is positioned and centered in the cylinder 21, it is suitably restrained from movement with respect to the cylinder by means such as a bracket 66 locked to flange 23 and extending over the disc and locked thereto by a set screw 67 bearing against plate 41 of centering arm 38 as shown in Figure 8. Preferably three brackets of this type are provided for bearing against similar plates of each of centering arms 38, 39, 40.

For convenience in handling the apparatus for disposing it within cylinder 21 and removing it therefrom, handles 68, 69 are suitably affixed to the top surface of the disc 36, as by means of screws 70, 71.

After the holder 24 has been placed in contact with a predetermined deoxidized surface portion of the inner wall of cylinder 21, as shown in Figure 6, which portion is not only accurately angularly oriented but also accurately spaced from the face plate 20, as aforedescribed, the flat side 25 of the hook is welded to such surface portion by means of electrodes 72, 73 suitably electrically energized. To facilitate the welding operation, the surface of hook 24 engaging the cylinder wall may have a plurality of dimples 74 thereon to reduce the cross-section of the path traversed by the welding current.

While the apparatus heretofore described is adapted to hold and position a hook type of support 24, and welding the same to the cylinder of a face plate assembly of a color cathode-ray tube, it may be modified easily to position and weld a support 75 of the type shown in Figure 9. This support includes a shank 76 integral with a flange 77. When this type of support is used, the V-block 28 affixed to the shadow mask frame 31 is adapted to receive a transverse portion of the shank 76. Additional means, not shown, are provided for maintaining the engagement between the V-block and shank aforementioned.

All that is needed to adapt the apparatus of the invention to position and weld supports 75 to the inner wall of the cylinder 21 in positions equally as accurate as those determined by the embodiment heretofore described, is to substitute for the work holding arms 54, 55, 56, an arm structure of the type shown in Figures 10 and 11. The modified arms each comprise an elongated plate 78, fixed to disc 36 as by screws 79. The plate 78 has a passageway, not shown, receiving a slide plate 80 in snug relation. Affixed to the slide plate 80 and extending to the outer end thereof is an elongated block 81 having a tubular nozzle 82 adapted to receive the shank 76 of work piece 75. The block 81 extends radially with respect to the center of disc 36. Mounted on block 81 for sliding movement therealong, is a structure including a nozzle 83 extending slightly beyond the free end of tubular nozzle 82 and having an opening for snugly receiving the shank 76 aforementioned. The structure referred to includes two flat legs 84, 85 fixed to a block 86 as by screws 86a. When the structure comprising the nozzle 83, legs 84, 85 and block 86, is moved to the right as viewed in Figure 11, the nozzle opening of nozzle 83 is adjacent the nozzle opening of nozzle 82. This is the position of the nozzles during centering of disc 36 in cylinder 21. After such centering has been accomplished, the structure comprising the slide plate 80, the elongated block 81, the nozzle 83, the two flat legs 84, 85 and block 86, is manually moved in a radial path determined by the aforementioned passageway in plate 78 until the embossments 89 on the support 75 are in contact with the inner wall of cylinder 21. A welding electrode 87 shown in Figure 10 is caused to bear against end 88 of block 86 remote from the nozzle 83 to cause the structure including nozzle 83, flat legs 84, 85, and block 86 to move radially away from the center of disc 36 and toward the inner wall of cylinder 21. The force of welding electrode 87 on the block 86 preserves a desired contact between flange 77 and the inner wall of cylinder 21, after the embossments 89 on the flange collapse during a welding cycle. Movement of this magnitude is permitted without causing motion of slide plate 80 and block 81 by the spacing 90 between the blocks 81 and 86. A welding operation is completed by bringing another welding electrode 91, shown in Figure 10, against the outer wall of cylinder 21.

The structure comprising the nozzle 83, the flat legs 84, 85, and block 86 is made of a metal or alloy of relatively low electrical resistivity, such as a copper alloy known commercially as Mallory No. 3.

The apparatus of the invention constitutes an appreciable contribution to the feasibility of fabricating a color cathode-ray tube of the type described, in that it renders practical an accurate mounting of supports for service as reference elements in a complex tube construction wherein both angular and rectilinear spacings must be determined with the highest degree of accuracy.

What is claimed is:

1. Apparatus for mounting in a predetermined plane shadow mask supports on the inner wall of a cylindrical member of a spherically contoured face plate assembly of a color cathode-ray tube for supporting a spherically contoured shadow mask a predetermined uniform distance from said face plate, said apparatus comprising a structure including a movable disc, holders mounted on one face of said disc and adjacent to the periphery thereof, and adapted to hold said supports, engaging means fixed to and extending from the opposite face of said disc and adapted to engage the inner face of said face plate when said disc is extended into said member in coaxial relation therewith and with said opposite face of the disc adjacent to said face plate, said engaging means and said holders having a dimension normal to said disc equal to the spacing between said plane and said face plate, whereby said holders are disposed in said predetermined plane when said engaging means engages said face plate, said holders being movable radially and away from the center of said disc to cause said supports to engage said inner wall in said predetermined plane, and means fixing said supports to said inner wall in said predetermined plane.

2. Apparatus for positioning elements in a reference plane and adjacent to the inner wall of a cylindrical member closed at one end by a closure member, comprising a flat support adapted to support said elements in a planar array, spacing members of equal length extending normal from one face of said flat support, said support being laterally compressible to dimensions smaller than the diameter of said member, whereby said support is adapted to be extended into said member in coaxial relation therewith and with the free ends of said spacing members engaging said closure member, said support being laterally expandable, holders mounted on said flat support adjacent to the periphery thereof, said holders being constructed to hold said elements adjacent to said periphery, and spreading means on said flat support laterally expanding said flat support, whereby said holders are moved toward said inner wall and said elements are disposed adjacent to said inner wall.

3. Apparatus for mounting elements on the inner wall of a cylindrical member closed at one end by a plate, in predetermined positions determined by predetermined angular spacings of said elements around said inner wall and a predetermined rectilinear spacing thereof from said plate, said apparatus comprising a disc compressible to a diameter less than that of said member, whereby the disc is adapted to be extended into said cylindrical member in coaxial relation therewith and with one face thereof remote from said plate, a plurality of holders mounted adjacent the periphery of said disc and adapted to hold said elements, said holders being separated by said predetermined angular spacings, said holders being in said predetermined angular positions when said disc is coaxial with said cylindrical member, means mounted on said one face of said disc and movable radially outwardly thereon to engage said inner wall said means including members movable in equal magnitudes for centering said disc with respect to said cylindrical member, elongated spacing means fixed to the other face of said disc and adapted to engage said plate, said spacing means having a predetermined length normal to said disc for providing said predetermined rectilinear spacing between said holders and said plate, whereby said holders are adapted to dispose said elements in said predetermined positions, and means fixing said elements to said inner wall in said predetermined positions.

4. Apparatus for mounting supports at predetermined positions on the inner wall of a cylindrical member closed at one end by a spherically contoured plate, said apparatus comprising holders adapted to hold said supports, a disc shaped support for said holders adapted to be extended into said cylindrical member, means mounted on one face of said disc for disposing the disc center on the axis of said cylindrical member, means mounted on the other face of said disc adapted to engage the inner face of said plate for disposing said disc in a plane normal to said axis, whereby said holders are disposed in positions radially opposite said predetermined portions, said holders being movable radially of said disc to cause said supports to engage said inner wall at said predetermined positions, and means for welding said supports to said inner wall in said predetermined positions.

5. Apparatus for positioning supports in predetermined positions in a cylindrical assembly of a cathode-ray tube wherein said assembly is closed at one end by a spherically contoured face plate; said apparatus comprising spaced holders adapted to hold said supports, said holders being spaced for disposing said supports in said predetermined positions when said apparatus is in coaxial relation with respect to said fact plate; and means for moving said apparatus to said coaxial relation, said means comprising three angularly spaced arms of equal length radially movable from a common center, a member coaxial with said center and movable rectilinearly on said axis, said member contacting the ends of said arms adjacent said center, whereby said arms are moved outwardly to engage inner cylindrical walls of said assembly when said member is moved in one direction to dispose said common center adjacent the axis of said face plate, said apparatus having three legs of equal length spaced in a circle having said center, whereby said apparatus is in said coaxial relation when said legs contact said face plate.

6. Apparatus for mounting elements on the inner wall of a cylindrical member closed at one end by a spherically contoured closure member, in a plane spaced a predetermined distance from an annular portion of said closure member, said apparatus comprising a structure including three legs of equal length defining a circle having a radius equal to that of a predetermined annular portion of said closure member, said structure being adapted to be extended into said cylindrical member to cause said legs to engage said closure member, said structure also including a plurality of supports for said elements, said supports being disposed in a plane spaced from the plane of the free ends of said legs said predetermined distance, and three centering arms movable on said support for engaging said inner wall and for moving said legs into engagement with said predetermined annular portion, said supports being movable on said structure to cause said elements supported thereby to engage said inner wall in said plane, and means for fixing said elements to said inner wall while supported in said plane.

7. Apparatus for positioning supports in predetermined positions adjacent the inner wall of a cylindrical assembly closed at one end by a spherically contoured plate, said apparatus comprising a disc, three angularly spaced holders on one face of said disc and adapted to hold said supports, said holders being adapted to dispose said supports in said predetermined positions when said disc is in coaxial relation with said cylindrical assembly and uniformly spaced a predetermined distance from an annular portion of said plate, and means for moving said disc to coaxial relation with said assembly and to said uniformly spaced predetermined distance, said means comprising three legs of equal length fixed to the other face of said disc and spaced to lie in a circle concentric with said disc and having a radius equal to the radius of said annular portion, three fingers of equal length mounted on said one face of the disc in angularly spaced relation, and movable thereon radially only, and a frustoconical member mounted on said disc in coaxial relation therewith and movable rectilinearly in axial directions and engaging adjacent ends of said fingers, said fingers having a length for engaging spaced portions of said inner wall when said frustoconical member is moved in one of said axial directions, whereby said disc is disposed in coaxial relation to said assembly and said legs engage said annular portion for disposing said supports in said predetermined positions.

8. Apparatus for positioning elements on the inner wall of a cylindrical member in predetermined angularly spaced relation and in a plane normal to the axis of and spaced a predetermined distance from a spherically curved plate closing one end of said cylindrical member; said apparatus comprising: supports having structures adapted to support said elements, said supports being fixed in said angularly spaced relation and in a common plane, three locating arms of equal length spaced angularly an equal degree from each other and movable in said common plane radially from a common center, and three legs extending normal to said common plane, said apparatus being radially compressible in said common plane for extension into said cylindrical member to cause said legs thereof to engage said curved plate, said legs having an equal length and being spaced an equal distance radially from said common center for disposing said supports in said normal plane when said legs engage an annular portion of said curved plate concentric with said plate, and means for moving said arms an equal distance in said angularly spaced relation and away from said common center until all three of said arms contact said inner wall, whereby said legs engage said annular portion and said supports dispose said elements in said angularly spaced relation and in said normal plane.

9. A positioning apparatus comprising a disc; means mounted on said disc and comprising elements spaced angularly from each other a predetermined distance in a plane parallel to said disc and adapted to support work pieces in locations having said angular spacing and in said parallel plane; and means for locating said supporting means in a predetermined plane normal to the axis of a spherically curved plate, said means comprising: three legs extending from said disc in a direction normal to said disc and being equally spaced from the center of said disc and adapted to contact one face of said curved plate, said legs having a length disposing said supporting means in said predetermined plane when said legs engage a predetermined annular portion of said curved plate, and three arms of equal length mounted in spaced angular relation on said disc and movable radially thereon; and power transfer means mounted on said disc and engaging an end of each of said arms for moving said arms radially from the center of said disc an equal distance; whereby said arms are adapted to engage the inner wall of a cylinder coaxial with said curved plate, and said legs are adapted to move into engagement with said predetermined annular portion of the curved plate, said co-planar elements being movable manually in said common plane toward said inner wall, whereby said work pieces are disposed in said predetermined plane with said predetermined angular spacing therebetween.

10. A positioning apparatus adapted to be extended into a cylindrical structure having an end closed by a spherically curved plate, for positioning work pieces adjacent the inner side wall of said structure at locations characterized by predetermined angular spacings and in a plane normal to the axis of said plate and spaced a predetermined distance from a predetermined annular portion of said curved plate, said apparatus comprising a plurality of holders disposed in an array characterized by said angular spacings, said holders being disposed in a common plane, and two groups of locating members, the members of one of said groups being movable with respect to said holders and in said common plane for centering said array with respect to said cylindrical structure, the other of said groups having members extending normal to said common plane and having lengths for contacting said predetermined annular portion when said array is centered.

11. A positioning apparatus adapted to be extended into a cylindrical structure having an end closed by a spherically curved plate, said apparatus having three parallel legs of equal length extending therefrom and disposed in a circular array and adapted to contact a face of said plate on extension of said apparatus into said structure, a plurality of holders supported by said legs and spaced in a circle concentric with said array and in a plane normal to said legs and adapted to hold work pieces to be positioned, three centering members supported on said legs in said normal plane and having free ends disposed in a circle concentric with said array, said holders and said centering members being relatively movable only in said normal plane, and means engaging the other ends of said centering members for moving said centering members an equal distance in said plane and into contact with the inner side wall of said cylindrical structure, whereby said legs are caused to engage an annular portion of said curved plate for positioning said work pieces a uniform distance from said curved plate.

12. Method of fixing a plurality of supports on the inner side wall of a cylindrical structure closed at one end by a spherically curved plate, in positions characterized by a uniform predetermined distance from said curved plate and in a plane normal to the axis of the plate, comprising positioning said supports an equal distance from random surface portions of said plate and in a common plane, moving said supports while preserving the equality of said distance to cause said common plane to coincide with said normal plane, moving said supports in the coincident plane only, and into contact with said inner side wall, and welding said supports to said inner side wall.

13. Method of fixing a plurality of supports to predetermined portions of the inner side wall of a cylindrical structure closed at one end by a spherically curved plate, comprising the steps of placing said supports in a circular array haivng a smaller diameter than said structure, extending said array into and in approximate coaxial relation with said structure to a position spaced from random portions of said plate a distance equal to the spacing of said predetermined portions of said inner side wall from predetermined portions of said plate, moving said array across said plate to accurately center said array with respect to said plate, expanding said array radially to cause said supports to contact said inner side walls at said predetermined portions thereof, and welding said supports to said last named portions.

14. Method of positioning and fixing work pieces in a cylindrical structure closed at one end by a spherically curved plate, in a predetermined plane normal to the axis of said cylindrical structure and in symmetrical relation to said plate and adjacent the inner side wall of said structure, said method comprising disposing said supports in a circular array of a smaller diameter than the diameter of said structure, placing said work pieces while in said circular array an equal distance from spaced portions of said plate, moving said work pieces across said plate while preserving said distance to cause said work pieces to be disposed opposite an annular portion of said plate, whereby said work pieces are in said predetermined plane, moving said work pieces radially in said plane into contact with said inner wall, and welding said work pieces to said inner side wall.

References Cited in the file of this patent

UNITED STATES PATENTS

| | | |
|---|---|---|
| 2,107,093 | Terrell | Feb. 1, 1938 |
| 2,178,877 | Marvin et al. | Nov. 7, 1939 |
| 2,224,598 | Gilbert | Dec. 10, 1940 |